US009436512B2

(12) United States Patent
Peng et al.

(10) Patent No.: US 9,436,512 B2
(45) Date of Patent: Sep. 6, 2016

(54) ENERGY EFFICIENT JOB SCHEDULING IN HETEROGENEOUS CHIP MULTIPROCESSORS BASED ON DYNAMIC PROGRAM BEHAVIOR USING PRIM MODEL

(71) Applicant: Board of Supervisors of Louisiana State University and Agricultural and Mechanical College, Baton Rouge, LA (US)

(72) Inventors: Lu Peng, Baton Rouge, LA (US); Bin Li, Metairie, LA (US)

(73) Assignee: BOARD OF SUPERVISORS OF LOUISANA STATE UNIVERSITY AND AGRICULTURAL AND MECHANICAL COLLEGE, Baton Rouge, LA (US)

(*) Notice: Subject to any disclaimer, the term of this patent is extended or adjusted under 35 U.S.C. 154(b) by 371 days.

(21) Appl. No.: 13/721,264

(22) Filed: Dec. 20, 2012

(65) Prior Publication Data

US 2013/0167154 A1    Jun. 27, 2013

Related U.S. Application Data

(60) Provisional application No. 61/579,408, filed on Dec. 22, 2011, provisional application No. 61/620,745, filed on Apr. 5, 2012.

(51) Int. Cl.
*G06F 9/50* (2006.01)
*G06F 11/34* (2006.01)

(52) U.S. Cl.
CPC .......... *G06F 9/5083* (2013.01); *G06F 9/5094* (2013.01); *G06F 11/3447* (2013.01); *G06F 11/3452* (2013.01); *Y02B 60/142* (2013.01)

(58) Field of Classification Search
CPC .. G06F 9/5083; G06F 9/5094; Y02B 60/142
USPC ................. 718/105; 712/E9.05, 32, E9.049
See application file for complete search history.

(56) References Cited

U.S. PATENT DOCUMENTS

| 7,269,586 | B1* | 9/2007 | Srivastava | G06F 17/30592 |
| 7,716,006 | B2* | 5/2010 | Coskun et al. | 702/132 |
| 8,010,822 | B2* | 8/2011 | Marshall et al. | 713/324 |
| 8,365,181 | B2* | 1/2013 | Flower et al. | 718/104 |
| 8,695,008 | B2* | 4/2014 | Regini et al. | 718/104 |
| 2002/0124002 | A1* | 9/2002 | Su | G06F 17/30539 |
| 2006/0095807 | A1* | 5/2006 | Grochowski et al. | 713/324 |
| 2006/0143071 | A1* | 6/2006 | Hofmann | 705/10 |
| 2009/0109230 | A1* | 4/2009 | Miller | G06F 1/3203 345/506 |
| 2010/0287099 | A1* | 11/2010 | Liu | G06Q 20/40 705/44 |
| 2011/0296212 | A1* | 12/2011 | Elnozahy | G06F 1/3203 713/320 |
| 2013/0073875 | A1* | 3/2013 | Anderson et al. | 713/300 |

OTHER PUBLICATIONS

Chong et al, Flexible patient rule induction method for optimizing process variables in discrete type, 2007, Elsevier, Expert system with Applications 34(2008) 3014-3020, 3015-3020.*

* cited by examiner

*Primary Examiner* — Abu Ghaffari
(74) *Attorney, Agent, or Firm* — Jason P. Mueller; Adams and Reese LLP

(57) ABSTRACT

Methods for efficient job scheduling in a heterogeneous chip multiprocessor that include logic comparisons of performance metrics to determine if programs should be moved from an advanced core to a simple core or vice versa.

18 Claims, 3 Drawing Sheets

ENERGY EFFICIENT JOB SCHEDULING IN HETEROGENEOUS CHIP MULTIPROCESSORS BASED ON DYNAMIC PROGRAM BEHAVIOR USING PRIM MODEL

CROSS-REFERENCE TO RELATED APPLICATIONS

This application claims benefit of U.S. Provisional Application 61/579,408 filed Dec. 22, 2011 and U.S. Provisional Application 61/620,745 filed Apr. 4, 2012, both of which are incorporated herein by reference.

FIELD

The present invention relates generally to the field of chip multiprocessors (CMPs), and in specific though non-limiting embodiments, to methods for improving energy efficiency in heterogeneous CMPs.

BACKGROUND

In the past decade, computer architects have been designing processors that deliver optimal performance. However, due to the nearly cubic relation between processor frequency and power consumption, the typical clock frequency of a single processor cannot be increased beyond a certain value. This so-called "power wall" problem is one of the most critical constraints in processor development. Because of continuously shrinking feature sizes, the number of transistors on a single chip is expected to double in the next few years. Accordingly, manufacturers now include multiple cores on a single chip. Compared to a uniprocessor chip running at an extremely high frequency, a multi-core design can deliver better performance with less power consumption. Chip Multiprocessors (CMPs) have become mainstream products in providing optimal performance while minimizing overall power consumption.

CMPs trim the power budget by integrating multiple processor cores on the same chip instead of raising the clock frequency of a single core. Most CMPs available in the current computer market, such as the Intel i7 960 processor, replicate cores of the same type, simplifying many design issues due to their architectural homogeneity. Recently, computer architects have been developing heterogeneous CMPs which combine different types of cores for better energy efficiency. One such example is the Cell microprocessor co-developed by Sony, Toshiba, and IBM. The Cell is composed of 8 Synergistic Processor Elements (SPE) and one Power Processor Element (PPE), where the advanced processor unit (PPE) works as a controller, and the high throughput comes from the parallel execution on the 8 SPEs. In the alternative, placing a number of cores with an identical instruction set architecture (ISA) but different hardware configurations on the same chip provides another type of heterogeneity. In such cases, programs may be dynamically mapped to the most suitable core(s) according to their resource requirements.

In a heterogeneous CMP, a program scheduler is responsible for program-to-core assignment during runtime. To increase energy efficiency, the scheduler should be aware of differences between integrated processors and program behaviors and make optimal job (i.e. program) assignments to a given core during runtime accordingly. Such functionality is not available in most state-of-the-art schedulers. Rather, most state-of-the-art schedulers were merely designed for homogenous architectures, and thus are not capable of achieving the optimal efficiency on a heterogeneous system. Strategies have been proposed to address this problem, such as a round robin scheduler, sampling-based dynamic scheduling, and latency-aware scheduling; however, these scheduling strategies tend to suffer from various drawbacks. For instance, a round robin scheduler, which periodically migrates jobs among cores, could result in inefficient execution in certain periods because the scheduler cannot determine optimal assignment. Sampling-based dynamic scheduling introduces substantial overhead due to forced migrations that are necessary to check scheduling conditions. Latency-aware scheduling categorizes programs as processor-bound or memory-bound by estimating the last-level cache miss penalties of the programs at runtime. Programs are assigned to different types of cores according to their categorization. However, the last-level cache miss rate is not a good indicator for a program's energy efficiency. Accordingly, current technologies and proposed strategies do not provide optimal scheduling based on differences in the cores and behaviors of programs.

SUMMARY

In an example embodiment of the present disclosure, a method for energy efficient job scheduling in a heterogeneous chip multiprocessor is provided. The method includes the steps of: a) simultaneously executing a first program on an advanced core on the chip multiprocessor and a second program on a simple core on the chip multiprocessor for an interval; b) comparing at least one performance measurement from the first program with at least one performance measurement from the second program with at least one rule extracted from a PRIM model; c) using a scheduler to move the first program to the simple core and the second program to the advanced core if the at least one rule extracted from a PRIM model determines that such a move would result in a lower energy consumption; and d) repeating steps a) to c). The interval is the time until a program reaches a scheduling point. The PRIM model is configured to predict if executing the first program on the simple core and the second program on the advanced core would result in the lower energy consumption.

The advanced core may be a superscalar processor configured to support out-of-order execution. The advance core further may include more functional units than the simple core. The advanced core may be further configured to have at least one of larger L1 and L2 caches than the simple core, more advanced branch predictors than the simple core, and more power consumption than the simple core.

The method may further comprise the following steps prior to step a): i) randomly selecting a plurality of program pairs, each pair comprising a first program and a second program; ii) simultaneously running the first program on the advanced core and the second program on the simple core for an interval; iii) recording a first set of performance counters from the first program having the form of $<X_b^1, X_b^2, X_b^3, \ldots, X_b^m>$, wherein the X variables are the performance counters and the superscript identifies the performance counter where m number of performance counters are recorded; iv) recording a second set of performance counters from the second program having the form of $<X_s^1, X_s^2, X_s^3, \ldots, X_s^n>$, wherein the X variables are the performance counters and the superscript identifies the performance counter where n number of performance counters are recorded; v) measuring and recording a first energy consumption value over the interval of step ii), wherein the first program and the second program were simultaneously run on the advanced core and the simple core, respectively; vi) measuring and recording a second energy consumption value over an interval wherein the first program and the second program were simultaneously run on the simple core and the advanced core, respectively; vii) defining a Boolean variable flag and setting the flag to TRUE if the second energy consumption value is less than the first energy consumption value; viii) defining a training sample having the form $<X_b^1, X_b^2, \ldots, X_b^m, X_s^1, X_s^2, \ldots, X_s^n, \text{flag}>$; ix) for each of the plurality of program pairs, executing steps ii) through viii), thereby defining a plurality of training samples wherein each training sample corresponds to exactly one of the program pairs; x) inputting the plurality of training samples into the PRIM model; and xi) extracting a plurality of rules from the PRIM model.

The plurality of rules may be configured to accept as input a first set of performance counters from a first program and a second set of performance counters from a second program, wherein the first program is run on an advanced core and the second program is run on a simple core, and wherein the rules are further configured to predict if running the first program on the simple core and the second program on the advanced core would yield a lower energy consumption.

The method may include the following steps after step ix): x) subdividing the plurality of training samples into subgroups; xi) inputting each subgroup into a PRIM model; and xii) extracting a plurality of rules from each PRIM model as a different rule set. The plurality of training samples may be subdivided with a Classification and Regression Tree (CART) mechanism. The first energy consumption value may be the value of the dynamic chip power usage performance counter of the chip multiprocessor at the end of an interval wherein the first program ran on the advanced core and the second program ran on the simple core, and wherein the second energy consumption value may be the value of the dynamic chip power usage performance counter of the chip multiprocessor at the end of an interval wherein the second program ran on the advanced core and the first program ran on the simple core. Each of the first energy consumption value and the second energy consumption value may be calculated by adding, at the close of each respective interval, the power of all components on the chip multiprocessor and the chip idle power. The power of a component on the chip multiprocessor may be calculated by the product of the component accessing rate, a scaling factor, and the maximal component power, wherein the component access rate is calculated from at least one chip multiprocessor performance counter, and each of the scaling factor and the maximal component power are calculated via at least one stress benchmark test.

In an example embodiment of the present disclosure, a method for efficient job scheduling in a heterogeneous chip multiprocessor is provided. The method includes the steps of: a) simultaneously executing n program pairs, each program pair comprising a first program run on one of m advanced cores and a second program run on one of n simple cores for an interval such that exactly one program is running on each of the m advanced cores and the n simple cores; b) for each of n iterations, simultaneously comparing at least one performance counter from the first program of each program pair with at least one performance counter from the second program of that program pair with at least one rule extracted from a PRIM model; and c) for each of n iterations, using the scheduler to swap the cores of the first program of each program pair with that of the second program of that program pair if the at least one rule extracted from the PRIM model determines that such a move would result in a lower energy consumption. The PRIM model is configured to predict if executing the first program on the simple core and the second program on the advanced core would result in the lower energy consumption. The number of advanced cores m may be greater than, equal to, or less than the number of simple cores n. If m is larger than n, the method may further include repeating steps a) to c) $\lceil m/n \rceil$ rounds. If m is less than n, the method may further include repeating steps a) to c) $\lceil n/m \rceil$ rounds.

DESCRIPTION

In an example embodiment of the present invention, energy efficient job scheduling is provided for heterogeneous chip-multiprocessors (CMPs) based on dynamic program behavior. In certain embodiments, a heterogeneous CMP may have an equal number of advanced cores, such as Intel Core 2 Duos, and simple cores, such as Intel Atoms. In exemplary embodiments, a rule-set guided scheduling method is provided for energy-efficient execution on heterogeneous CMPs based on dynamic program execution behaviors. The method may include one or more sets of "IF-ELSE" conditions with regard to common performance metrics. Each condition may be expressed as an inequality, such as $X_i <=$ (or $>=$) N, where $X_i$ is a measured performance metric and N is a certain/definitive value of said metric. With these extracted rules, a scheduler is able to assign the jobs for optimal energy efficiency.

Figure 1A:
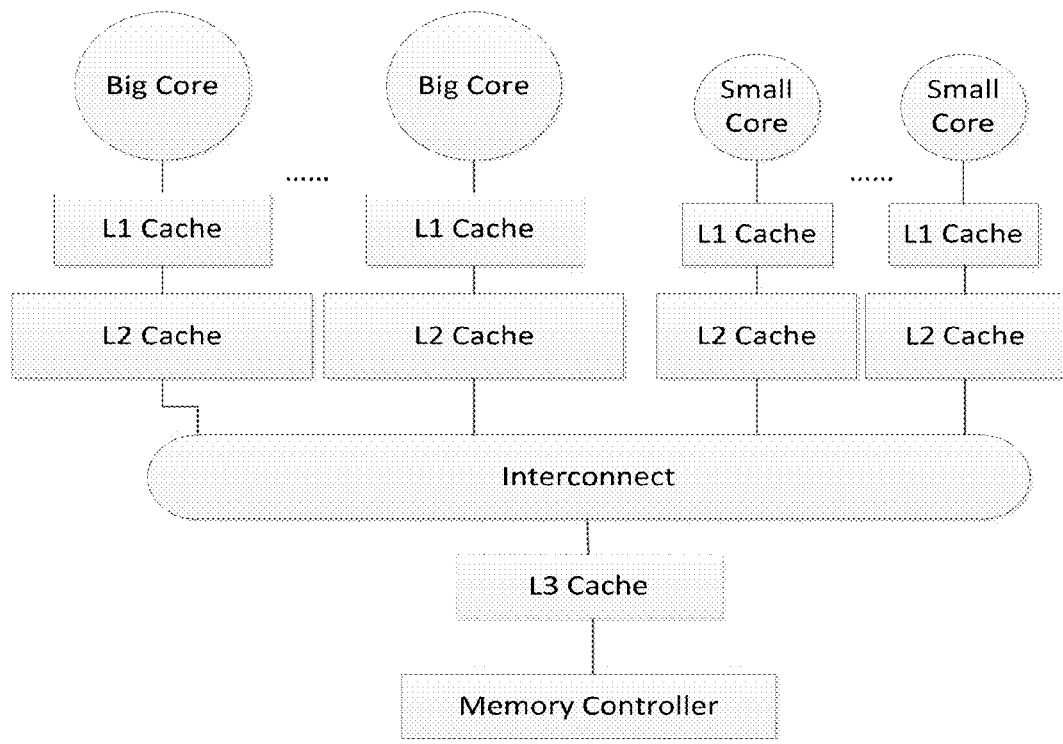
FIG. 1(a) is a schematic showing a heterogeneous chip multiprocessor having private L2 cache, according to an exemplary embodiment of the present invention.
Figure 1B:
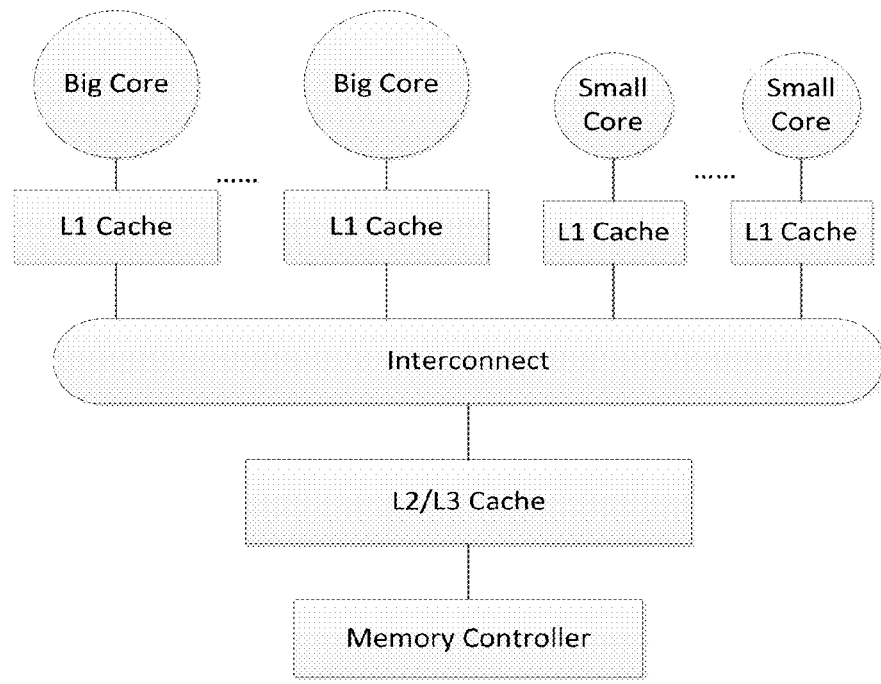
FIG. 1(b) is a schematic showing a heterogeneous chip multiprocessor having shared L2 cache, according to an exemplary embodiment of the present invention.

According to an exemplary embodiment of the present invention, a rigorous scheduling algorithm guided by a set of rules on dynamic program performance measurements to achieve energy-efficient executions on heterogeneous CMPs is provided. In some embodiments, the architecture of such a system may include a single-ISA CMP containing an equal number of big/advanced and small/simple cores. FIGS. 1(a) and 1(b) illustrate heterogenous CMPs according to two exemplary embodiments of the present invention. In FIG. 1(a), each core has a private L1 and L2 cache; all cores connect to DRAM via the shared memory controller and interconnection. The chip may further include an on-chip L3 cache. In FIG. 1(b), each core has a private L1 cache but shares the on-chip L2 cache. The chip may also have an on-chip L3 cache. In certain embodiments, the interconnect bandwidth may be identical on both types of core. In exemplary embodiments, an advanced core may be a superscalar processor that supports out-of-order execution and may further integrate more functional units, larger caches, and more advanced branch predictors than a simple one.

A big/advanced core, such as an Intel Core 2 Duo, can deliver better performance but consumes more power than a small/simple core, such as an Intel Atom. However, due to inherent data dependences or memory access patterns, some programs may not have impressive performance improvement on a big/advanced core compared to performance on a small/simple core. In such instances, it may be reasonable to execute the same job on a small/simple core. In a heterogeneous CMP, such programs may be executed on a small/simple core with less power consumption. Therefore, dynamically switching the programs running on these two cores by adapting to the programs' behavior can achieve the optimal energy efficiency of the entire CMP.

In one embodiment, a system is provided that monitors dynamic execution parameters/performance metrics of each program/job running on one of a plurality of cores of a CMP. The heterogeneous CMP includes one or more of two types of cores (simple and advanced). At a scheduling point, the scheduler compares collected performance measurements to selective rules for each program and evaluates whether migrating a job to a different type of core will lead to higher energy efficiency. If performing the migration is beneficial to system efficiency, the program will be moved to the other type of core for execution until the next scheduling point, otherwise the current scheduling is retained. The system is advantageous for several reasons. The system is "aware" of the heterogeneity between processor cores and is able to conduct the optimal assignment according to the dynamic execution behaviors. The selective rules may be generated by an advanced statistical tool, thus scheduling does not rely on arbitrarily selected variables, but is rather guided by factors that are essentially influential to execution. Finally, the runtime overhead of this system/method is small due to the simplicity of the generated rules. Since most modern commercial processors provide hardware performance counters, implementation of the disclosed invention does not require any new hardware resources and eliminates overhead resulting from periodic samplings.

According to an exemplary embodiment of the present invention, a scheduling algorithm may be derived from a Patient Rule Induction Method (PRIM) algorithm. A PRIM model may be used to bridge the gap between common performance metrics and scheduling conditions. An object of PRIM is to find a region in an input space that gives relatively high values for the output response. The selected region (or "box") is described in a interpretable form involving a set of "rules" depicted as:

$$B = \bigcap_{j=1}^{p}(x_j \in s_j)$$

wherein $x_j$ represents the jth input variable and $s_j$ is a subset of all possible values of the jth variable.

Figure 2:
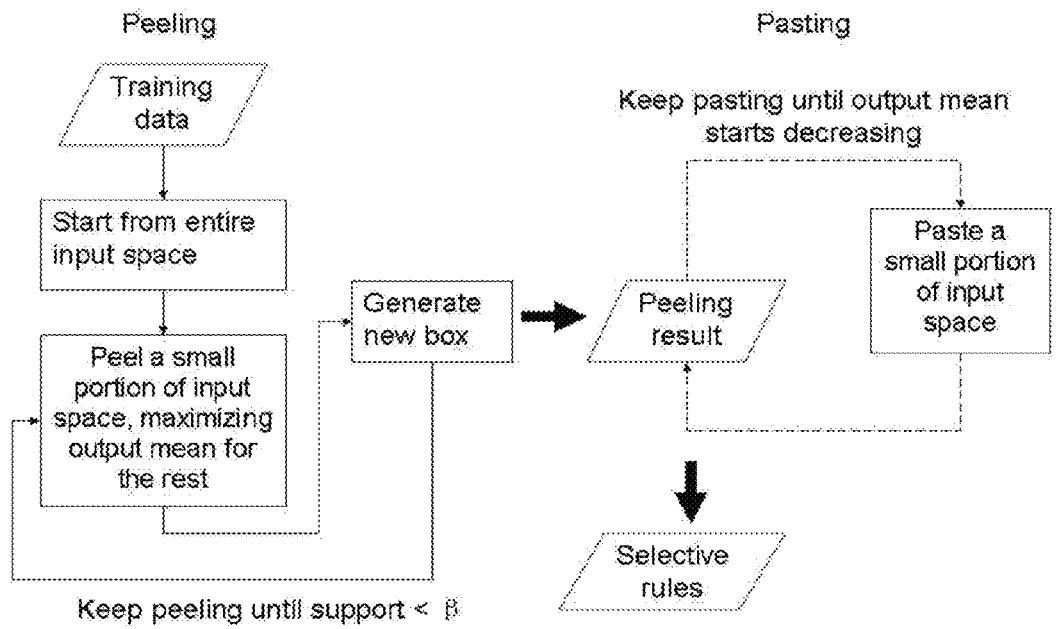
FIG. 2 is a flow chart for a PRIM training procedure with peeling and pasting, according to an exemplary embodiment of the present invention.

As illustrated in FIG. 2, the construction of the selected region may be composed of two phases: (1) a patient successive top-down peeling process; and (2) a bottom-up recursive pasting process. The top-down peeling starts from the entire space (box B) that covers all of the data. At each iteration, a small sub-box b within the current box B is removed, which yields the largest output mean value in the result box B-b. This operation may be performed iteratively and stops when the support of the current box B is below a chosen threshold $\beta$, which is actually the proportion of the intervals identified as vulnerable regions.

The pasting algorithm works inversely from the peeling results and the final box may sometimes be improved by readjusting its boundaries. Starting with the peeling solution, the current box B is iteratively enlarged by pasting onto it a small sub-box that maximizes the output mean in the new (larger) box. The bottom-up pasting may be iteratively applied, successively enlarging the current box, until the addition of the next sub-box causes the output mean to decrease.

An advantage of PRIM over greedy methods, such as tree-based methods, is its patience. For example, a binary tree rapidly fragments the data because of the binary splits in the tree, while the PRIM model only peels off a small proportion of data with each iteration. Consequently, the solutions of PRIM models (i.e., hyper-boxes) are usually much more stable than those obtained from tree models.

Although an advanced statistical tool such as PRIM is able to build a rigorous correlation between multiple input variables and a response, the accuracy of the model depends on features of the applications/programs in the training set. For example, if the execution behaviors of a few intervals significantly deviate from those of other training instances while their response values are identical, a single universal PRIM model may not be capable of capturing those runtime variations. This limitation is due to the fact that the PRIM algorithm has a tendency to build a model that fits the majority situations in the training instances. As a consequence, the established model may ignore those samples appearing less frequently, and when the model is applied to applications that show similar behavior to the neglected cases in the training set, the resulting accuracy may be relatively poor.

Thus, in certain embodiments of the present invention, it may be reasonable to partition the entire data set into several categories, each of which contains instances demonstrating similar characteristics. A PRIM model may then be trained for each data subset, with each PRIM model generating a corresponding group of rule sets. The obtained rules are more robust and thus more effective in handling different execution scenarios. In some embodiments, the statistical tool Classification and Regression Tree (CART) may be used for the data segmentation (i.e., partitioning of the data set). CART is an alternative to linear and additive models for regression problems. CART models may be configured with a recursive partitioning whereby a dataset is successively split into increasingly homogeneous subsets until the information gained by additional splits is not outweighed by the additional complexity due to the tree's growth. Trees are adept at capturing non-additive behavior, e.g. interactions among input variables may be routinely and automatically handled. Further, regression tree analyses (such as CART) can easily handle a mix of numeric and categorical input variables.

One embodiment of the present invention may include two programs (A and B) run on a two-core CMP with one big/advanced core and one small/simple core. For a program phase, it is necessary to compare the total energy consumption of the following two cases: (1) A on the big core and B on the small core; and (2) B on the big core and A on the small core. Between these two cases, the case exhibiting the lower energy consumption should be selected. Furthermore, an Oracle scheduler may examine these two cases during runtime (at each scheduling point), swapping the two programs if necessary to achieve the optimal energy efficiency.

However, dynamically determining the optimal schedule for a program during runtime is a challenging problem. Accordingly, a PRIM algorithm may be used to generate selective rules on a number of program performance measurements. In a program phase, if the measured performance counters conform to these rules, the scheduler switches the two programs between the two types of cores.

More specifically, the PRIM model training may include the following steps. First, a certain number of program pairs is randomly selected. For each program pair (A, B), it is assumed that A runs on the big core and B runs on the small core. For each interval (a certain time unit), the following information may be obtained by executing A and B on the big and small cores, respectively:

Program A: $<X_b^1, X_b^2, X_b^3, \ldots, X_b^m>$
Program B: $<X_s^1, X_s^2, X_s^3, \ldots, X_s^n>$ In the tuple of a program, X variables denote performance counters that can be measured, such as the number of cache misses and the number of branch mis-predictions. The subscript of each variable indicates the corresponding platform (i.e., b=big core, s=small core). In this example, m performance counters are measured on the big core and n performance counters are measured on the small core. Second, energy consumption of this schedule is compared with its counterpart (i.e. B on the big core and A on the small core), setting a Boolean variable (flag) to one ("TRUE") if swapping these two programs will generate lower energy. Relative performance of a program between big and small cores, i.e., Instruction-Per-Cycle (IPC) ratio, is widely employed as a scheduling heuristic in existing schedulers. Specifically, placing the program with larger IPC ratio on the big core while assigning the one with smaller IPC ratio to the small core is effective to boost the overall performance and improve the energy efficiency in most cases. In certain embodiments of the present invention, the flag may be set based on the IPC ratios of both programs.

In certain embodiments of the present invention, the processor may provide a counter to report dynamic chip power usage. In such embodiments, the whole chip energy usage for two cases (i.e., program A running on the big core and program B running on the small core, or vice versa) may be compared. The Boolean flag may be set based on this comparison. In some embodiments, the processor having a counter to report dynamic chip power usage may be a chip having an Intel Sandy Bridge architecture and other such products supporting dynamic power measurement for the whole chip by using a model-specific register (MSR).

In other embodiments of the present invention wherein there is no dynamic energy reporting function on the chip, an accurate estimate of runtime energy may be obtained by multiplying the average power and the execution time. The dynamic power of the chip may be estimated from performance counters through another predictive model. Specifically, the chip power may be added up by each component's power which will be estimated by the product of each component's accessing rate, a scaling factor, and the maximal component power, plus idle power. The component's access rate may be read and calculated from performance counters; the maximal power of each component and the scaling factors are generated and tuned by running a set of stress benchmarks.

Consequently, a PRIM training sample may be formed by combining the above information: $<X_b^1, X_b^2, \ldots, X_b^m, X_s^1, X_s^2, \ldots, X_s^n, flag>$.

Finally, the training samples measured from all selected program pairs may be input into the PRIM model, and the selective rules extracted. The inputs are the m+n performance counters from both cores, and the output is the Boolean flag that indicates if these two programs need to be switched in the next interval. The PRIM rules identify the input space sub-region that has the highest response values. Therefore, the above generated rules quantify the situations that a program switch between the big and small cores is needed (to achieve better energy efficiency).

Figure 3:
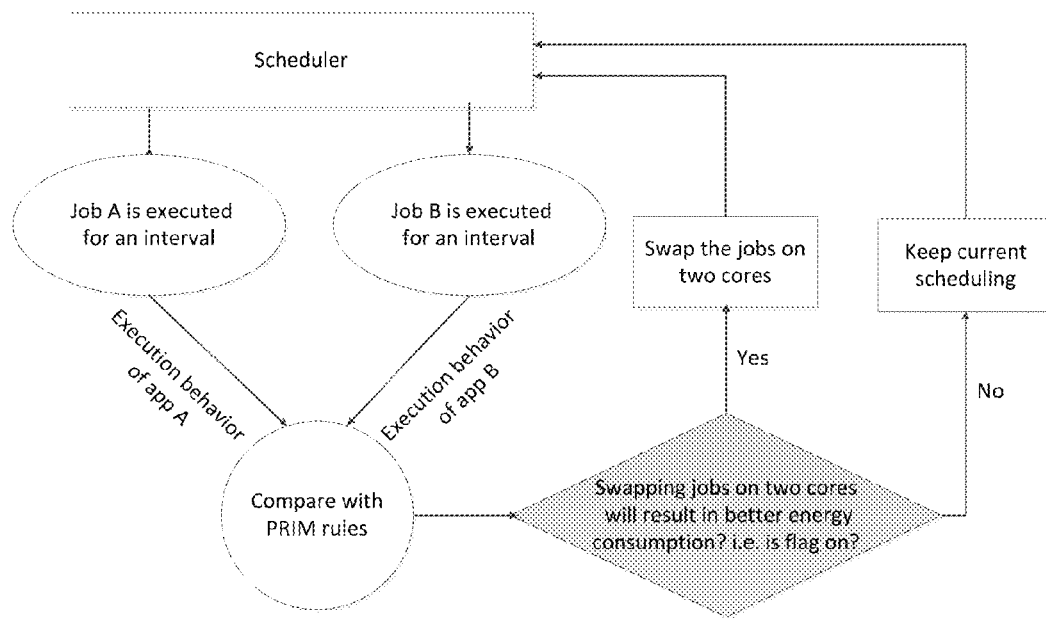
FIG. 3 is a flow chart for PRIM rules guided scheduling, according to an exemplary embodiment of the present invention.

As illustrated in FIG. 3, the PRIM rules may then be engaged by the operating system and/or scheduler to guide scheduling of programs A and B. The two applications are first simultaneously executed on the two cores (one big and one small) for an interval. At a scheduling point, the performance measurements of the current interval are compared with the extracted PRIM rules. If conditions on both cores are satisfied, the model predicts that swapping the two programs will have better energy efficiency; otherwise the present scheduling is preserved. The scheduler then makes the assignment based on the prediction result and continues the execution to the next scheduling point.

Effectiveness of the PRIM model is dependent upon on the features of the applications that are used for training. For instance, if the programs in the training set demonstrate significantly different execution behavior than the test programs, the derived rules may not be effective in identifying the swapping cases. Accordingly, in certain embodiments of the present invention, model accuracy can be further improved by preprocessing training data. Instead of training a single PRIM model, a number of different PRIM models may be built according to the similarity of different training applications. Specifically, a partitioning mechanism such as CART may be utilized to partition the input space into one or more sub-regions, as discussed above. Points belonging to each individual sub-region may be similar in terms of energy efficiency. A separate PRIM model may be built for each of these sub-regions, the result of which will be a set of rule sets. When making predictions during runtime, the sub-region the current input sample is located on is identified, then the corresponding rule set is used to determine if a program switch is needed. In practice, the number of sub-regions does not need to be large. Some preliminary experiments showed that partitioning the input space into 4 sub-regions (and also training the 4 PRIM models) can result in prediction accuracy within only 2% difference than an Oracle scheduler. This approach is called Hierarchical PRIM (or hPRIM).

Figure 4:
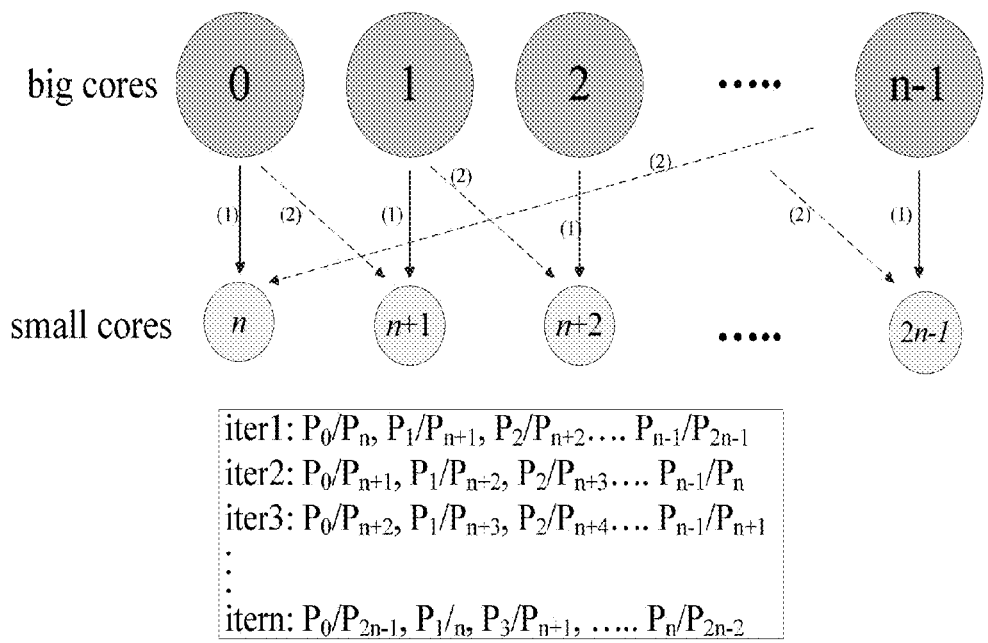
FIG. 4 is an illustration of a pair-wise comparison in 2n-program scheduling, according to an exemplary embodiment of the present invention.

Other embodiments of the present invention may be scaled to CMPs with more than 2 cores. Supposing the CMP has n big cores and n small cores, an algorithm may be introduced that only performs n iterations (each having parallel pair comparisons) to achieve the optimal scheduling. FIG. 4 illustrates the scheduling process when there are n big and n small cores on a chip. As shown in that figure, a total of n iterations are needed. In the first iteration, a big core with the index i (i∈[0, n−1]) is compared with the small core whose index is (n+i % n). All n pair comparisons are performed in parallel. In the second iteration, the big core i will be compared with the small core (n+(1+i)% n). Similarly, the comparison will be conducted between the big core i and the small core (n+(n−1+i)% n) in the nth iteration. Mod operations are involved to emulate the rotational comparisons. In certain embodiments of the present invention, a method for generating the optimal schedule for a CMP with n big/advanced cores and n small/simple cores may be described as follows. Since there are n big/advanced cores and n small/simple cores, as well as 2n jobs running on all cores, the optimal schedule is a situation that n jobs suitable for running on the big cores for energy efficiency (labeled as "1"s) will be assigned to the n big/advanced cores and the remaining jobs (labeled as "0"s) will be allocated to the n small/simple cores. All "1"s will be assigned to big/advanced cores and all "0"s will be assigned to small/simple cores after n iterations, even though it is not known at the beginning of the method which jobs are properly denoted as "1"s and "0"s.

During each of the n iterations, there are n parallel comparisons between big/advanced cores and small/simple cores. For each comparison, the ideal energy efficiency combination for the two jobs running on a big-small core pare is determined. Therefore, there are four possible situations before the comparison:

(1) a "1" job running on a big core compared with a "0" job running on a small core;
(2) a "0" job running on a big core compared with a "1" job running on a small core;
(3) a "1" job running on a big core compared with another "1" job running on a small core; and
(4) a "0" job running on a big core compared with another "0" job running on a small core.

For the first two cases, the method will generate an ideal situation where the "1" job is assigned to the big core (i.e., no action will be taken for case (1), and the jobs will be swapped for case (2)). For case (3), a "1" job will also be allocated on a big core, no matter which "1" job is assigned. Similarly, a "0" job will be set on a big core in case (4). However, in the event of case (4), note that there must be a "1" job running on a small core, considering that the number of "1" jobs is equal to the total number of big cores. There must be a chance for this "1" job running on a small core to compare with a "0" job running on a big core in the future iterations since there are n iterations for which we have n parallel comparisons. Thus, any case (3) comparison will eventually fall into a case (2) comparison. Accordingly, all "1" jobs will be swapped into big cores after at most n iterations, thereby achieving the optimal schedule after n iterations.

Figure 5:
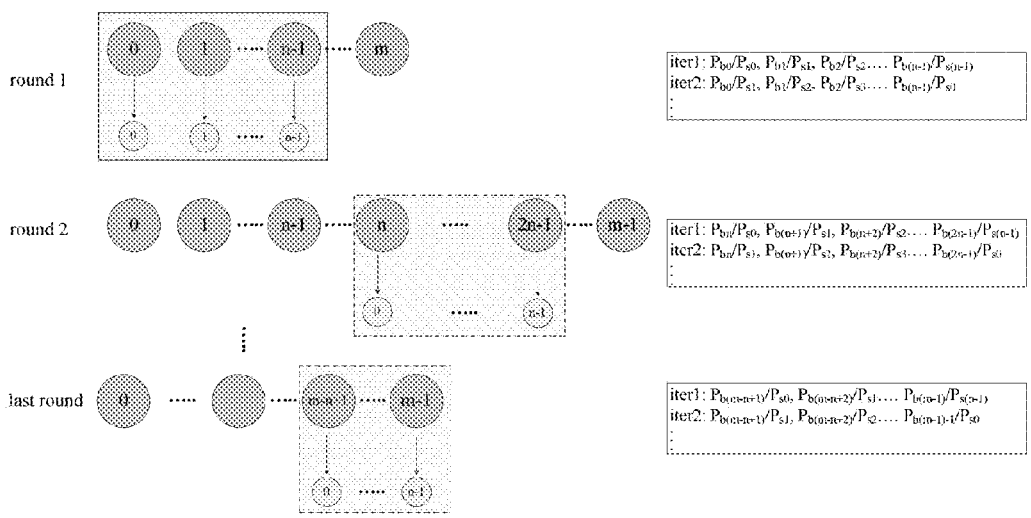
FIG. 5 is an illustration of a scheduling procedure on a heterogeneous CMP, according to an exemplary embodiment of the present invention.

In certain embodiments, the algorithm may be further generalized to guide the scheduling on a heterogeneous CMP with non-equivalent number of big and small cores. In the example embodiment represented in FIG. 5, there are m big cores and n small cores. Therefore, there should be a total of m jobs with label "1" and n jobs with label "0". Assuming that m is greater than n, the PRIM-based approach is capable of reaching the desired scheduling status by performing [m/n] rounds of parallel comparisons described in above as shown in FIG. 5. In case that m is less than n, the algorithm is similar but requires [n/m] rounds of parallel comparisons.

FIG. 5 illustrates the scheduling procedure on such a heterogeneous CMP. The parallel comparisons are conducted within a window whose size is equal to n (i.e., the smaller number between m and n), which permits n iterations of parallel comparisons between n big and n small cores. The total number of "0" jobs is n and total number "1" jobs is m. After each round of parallel pair comparisons between n big cores and n small cores, all of the n big cores will have "1" jobs running on them. Therefore, after [m/n] rounds of parallel comparisons, all big cores will have "1" jobs. Meanwhile, all "0" jobs are scheduled running on the small cores.

While the embodiments are described with reference to various implementations and exploitations, it will be understood that these embodiments are illustrative and that the scope of the inventions is not limited to them. Many variations, modifications, additions, and improvements are possible. Further still, any steps described herein may be carried out in any desired order, and any desired steps may be added or deleted. Support for the present invention may be found in the attached figures, all of which are expressly incorporated herein in their entirety by reference hereto.

What is claimed is:

1. A method for energy efficient job scheduling in a heterogeneous chip multiprocessor, comprising the steps of:
   a) randomly selecting a plurality of program pairs, each pair comprising a first program and a second program;
   b) simultaneously executing the first program on an advanced core on the chip multiprocessor and the second program on a simple core on the chip multiprocessor for an interval;
   c) comparing at least a first set of performance counters from the first program with at least a second set of performance counters from the second program with at least one rule extracted from a Patient Rule Induction Method (PRIM) model;
   d) using a scheduler to move the first program to the simple core and the second program to the advanced core if the at least one rule extracted from the PRIM model determines that such a move would result in a lower energy consumption; and
   e) repeating steps b) to d),
wherein the at least one rule extracted from the PRIM model is configured to accept as input the first set of performance counters from the first program and the second set of performance counters from the second program, and wherein the at least one rule is configured to predict if running the first program on the simple core and the second program on the advanced core would yield the lower energy consumption.

2. The method of claim 1, wherein the advanced core is a superscalar processor configured to support out-of-order execution.

3. The method of claim 2, wherein the advanced core further includes at least one of more functional units than the simple core, larger L1 and L2 caches than the simple core, and more advanced branch predictors than the simple core, each of which allows the advanced core to consume more power than the simple core.

4. The method of claim 2, wherein the method includes the following steps:
   i) recording the first set of performance counters from the first program having the form of $<X_b^1, X_b^2, X_b^3, \ldots, X_b^m>$, wherein the X variables are the performance counters and the superscript identifies the performance counter where m number of performance counters are recorded;
   ii) recording the second set of performance counters from the second program having the form of $<X_s^1, X_s^2, X_s^3, \ldots, X_s^n>$, wherein the X variables are the performance counters and the superscript identifies the performance counter where n number of performance counters are recorded;
   iii) measuring and recording a first energy consumption value over the interval, wherein the first program and the second program were simultaneously run on the advanced core and the simple core, respectively;
   iv) measuring and recording a second energy consumption value over the interval wherein the first program and the second program were simultaneously run on the simple core and the advanced core, respectively;
   v) defining a Boolean variable flag and setting the flag to TRUE if the second energy consumption value is less than the first energy consumption value;

vi) defining a training sample having the form $<X_b^1, X_b^2, \ldots, X_b^m, X_s^1, X_s^2, \ldots, X_s^n,$ flag$>$;

vii) for each of the plurality of program pairs, executing steps i) through vi), thereby defining a plurality of training samples wherein each training sample corresponds to exactly one of the program pairs;

viii) inputting the plurality of training samples into the PRIM model; and ix) extracting a plurality of rules from the PRIM model.

5. The method of claim 4, wherein the plurality of rules are configured to accept as the input the first set of performance counters from the first program and the second set of performance counters from the second program, wherein the first program is run on the advanced core and the second program is run on the simple core, and wherein the plurality of rules are further configured to predict if running the first program on the simple core and the second program on the advanced core would yield the lower energy consumption.

6. The method of claim 5, substituting the following steps after step vii)

x) subdividing the plurality of training samples into subgroups;

xi) inputting each subgroup into the PRIM model;

xii) extracting a plurality of rules from each PRIM model as a different rule set.

7. The method of claim 6, wherein the plurality of training samples is subdivided with a Classification and Regression Tree (CART) mechanism.

8. The method of claim 4, wherein the first energy consumption value is the value of the dynamic chip power usage performance counter of the chip multiprocessor at the end of the interval wherein the first program ran on the advanced core and the second program ran on the simple core, and wherein the second energy consumption value is the value of the dynamic chip power usage performance counter of the chip multiprocessor at the end of the interval wherein the second program ran on the advanced core and the first program ran on the simple core.

9. The method of claim 4, wherein each of the first energy consumption value and the second energy consumption value are calculated by adding, at the close of each respective interval, the power of all components on the chip multiprocessor and the chip idle power.

10. The method of claim 9, wherein the power of a component on the chip multiprocessor is calculated by the product of the component accessing rate, a scaling factor, and the maximal component power, wherein the component access rate is calculated from at least one chip multiprocessor performance counter, and each of the scaling factor and the maximal component power are calculated via at least one stress benchmark test.

11. The method of claim 1, wherein the interval is the time until the first and second programs reaches a scheduling point, the scheduling point being the point at which the scheduler compares the at least first set of performance counters from the first program and the at least second set of performance counters from the second program with the at least one rule extracted from the PRIM model, and evaluates whether migrating the first program to the simple core and the second program to the advanced core will result in the lower energy consumption.

12. A method for energy efficient job scheduling in a heterogeneous chip multiprocessor, comprising the steps of:

a) simultaneously executing n program pairs, each program pair comprising a first program run on one of m advanced cores and a second program run on one of n simple cores for an interval such that exactly one program is running on each of the m advanced cores and the n simple cores;

b) for each of n iterations, simultaneously comparing at least one performance counter from the first program of each program pair with at least one performance counter from the second program of that program pair with at least one rule extracted from a Patient Rule Induction Method (PRIM) model; and c) for each of n iterations, using a scheduler to swap the cores of the first program of each program pair with that of the second program of that program pair if the at least one rule extracted from the PRIM model determines that such a move would result in a lower energy consumption, wherein the PRIM model is configured to predict if executing the first program on the simple core and the second program on the advanced core would result in the lower energy consumption, wherein the power of a component on the chip multiprocessor is calculated by the product of the component accessing rate, a scaling factor, and the maximal component power, wherein the component access rate is calculated from at least one chip multiprocessor performance counter, and each of the scaling factor and the maximal component power are calculated via at least one stress benchmark test.

13. The method of claim 12, wherein m is equal to n.

14. The method of claim 12, wherein m is larger than n.

15. The method of claim 14, further comprising: repeating steps a) to c) $\lceil m/n \rceil$ rounds.

16. The method of claim 12, wherein m is less than n.

17. The method of claim 16, further comprising: repeating steps a) to c) $\lceil n/m \rceil$ rounds.

18. A method for energy efficient job scheduling in a heterogeneous chip multiprocessor, comprising the steps of:

a) randomly selecting a plurality of program pairs, each pair comprising a first program and a second program;

b) simultaneously executing the first program on an advanced core on the chip multiprocessor and the second program on a simple core on the chip multiprocessor for an interval;

c) measuring and recording a first energy consumption value over the interval, wherein the first program and the second program were simultaneously run on the advanced core and the simple core, respectively;

d) measuring and recording a second energy consumption value over the interval wherein the first program and the second program were simultaneously run on the simple core and the advanced core, respectively;

e) comparing at least one performance measurement from the first program with at least one performance measurement from the second program with at least one rule extracted from a Patient Rule Induction Method (PRIM) model;

f) using a scheduler to move the first program to the simple core and the second program to the advanced core if the at least one rule extracted from the PRIM model determines that such a move would result in a lower energy consumption; and g) repeating steps b) to f), wherein the PRIM model is configured to predict if executing the first program on the simple core and the second program on the advanced core would result in the lower energy consumption, wherein the power of a component on the chip multiprocessor is calculated by the product of the component accessing rate, a scaling factor, and the maximal component power, wherein the component access rate is calculated from at least one chip multiprocessor performance counter, and each of the scaling factor and the maximal component power are calculated via at least one stress benchmark test.

* * * * *